United States Patent [19]
Cage et al.

[11] Patent Number: 4,876,898
[45] Date of Patent: Oct. 31, 1989

[54] HIGH TEMPERATURE CORIOLIS MASS FLOW RATE METER

[75] Inventors: Donald R. Cage, Longmont; Craig B. Van Cleve, Lyons, both of Colo.

[73] Assignee: Micro Motion, Inc., Boulder, Colo.

[21] Appl. No.: 257,806

[22] Filed: Oct. 13, 1988

[51] Int. Cl.$^4$ ................................................ G01F 1/84
[52] U.S. Cl. .................................................... 73/861.38
[58] Field of Search ......................... 73/861.37, 861.38

[56] References Cited

U.S. PATENT DOCUMENTS

| | | | |
|---|---|---|---|
| 2,982,888 | 5/1961 | Whearley | 317/158 |
| 3,223,553 | 12/1965 | Morey | 117/215 |
| 3,308,414 | 3/1967 | Ostrander et al. | 336/205 |
| 4,406,056 | 9/1983 | Buckley et al. | 29/605 |
| 4,422,338 | 12/1983 | Smith | 73/861.38 |
| 4,491,025 | 1/1985 | Smith et al. | 73/861.38 |
| 4,503,605 | 3/1985 | Buckley | 29/605 |
| 4,554,730 | 11/1985 | Westervelt | 29/605 |
| 4,653,332 | 3/1987 | Simonsen | 73/861.58 |
| 4,738,143 | 4/1988 | Cage et al. | 73/861.38 |

Primary Examiner—Herbert Goldstein
Attorney, Agent, or Firm—Peter L. Michaelson

[57] ABSTRACT

Apparatus is disclosed for a Coriolis mass flow rate meter and specifically such a meter that is suited for operation at relatively high temperatures, such as in excess of approximately 500° F. (approximately 260° C.) and preferbly as high as 800° F. (approximately 427° C.), and that does not utilize a cooling purge.

10 Claims, 3 Drawing Sheets

HIGH TEMPERATURE CORIOLIS MASS FLOW RATE METER

BACKGROUND OF THE INVENTION

1. Field of the Invention

This invention relates to apparatus for a Coriolis mass flow rate meter and specifically such a meter that is suited for operation at relatively high temperatures, such as in excess of approximately 500° F. (approximately 260° C.).

2. Description of the Prior Art

Currently, Coriolis mass flow rate meters are finding increasing use in many applications as an accurate way to measure the mass flow rate of various process fluids.

Generally speaking, a Coriolis mass flow rate meter, such as that described in U.S. Pat. No. 4,491,025 (issued to J. E. Smith et al on Jan. 1, 1985), contains one or two parallel conduits, each typically being a U-shaped flow conduit or tube. Each flow conduit is driven, by a magnetic drive assembly, to oscillate about an axis to create a rotational frame of reference. For a U-shaped flow conduit, this axis can be termed the bending axis. As process fluid flows through each oscillating flow conduit, movement of the fluid produces reactionary Coriolis forces that are orthogonal to both the velocity of the fluid and the angular velocity of the conduit. These reactionary Coriolis forces cause each conduit to twist about a torsional axis that, for a U-shaped flow conduit, is normal to its bending axis. The amount of twist imparted to each conduit is related to the mass flow rate of the process fluid flowing therethrough. This twist is frequently measured using velocity signals obtained from magnetic velocity sensors that are mounted to one or both of the flow conduits in order to provide a complete velocity profile of the movement of each flow conduit with respect to either the other conduit or a fixed reference.

Coriolis meters known in the art, and as generally described above, utilize separate coils of wire for use within each magnetic velocity sensor and the magnetic drive assembly. Generally, a dual tube Coriolis meter has two magnetic velocity sensors situated in opposing positions on the sides of the two flow conduits and a single magnetic drive assembly frequently mounted to both flow conduits at respective opposing points thereon that are situated equidistant from corresponding ends of both conduits. In particular, each magnetic velocity sensor is typically fabricated with a sensing coil mounted to one of two flow conduits. A magnet that moves coaxially within the sensing coil is mounted to the other flow conduit. Whenever the magnet and sensing coil move in a differential sinusoidal pattern with respect to each other as dictated by respective differential sinusoidal conduit movement occurring thereat, the magnet induces a sinusoidal voltage in the sensing coil. The voltage produced by each sensing coil is then routed, through wiring, to an external electronic circuit which, in turn, determines the mass flow rate of the process fluid as a function of these two voltages. The drive assembly has a similar configuration to either sensing coil. In a dual tube meter, a drive coil that forms part of the drive assembly is mounted to one of the flow conduits with a magnet, also part of the drive assembly and adapted for coaxial movement within the coil, mounted at an opposing point on the other conduit. A sinusoidal voltage generated by the external electronic Circuit is applied, also via the wiring, to the drive coil. This voltage causes both the magnet and drive coil in the drive assembly to oscillate in a differential sinusoidal pattern thereby placing both flow conduits in opposing oscillatory motion about their respective bending axes.

Frequently, applications arise where accurate mass flow measurement is needed of a process fluid that flows at an elevated temperature, such as above 500° F. (approximately 260° C.). For example, one such application prevalent in the pulp and paper industry might involve the mass flow measurement of tall oil that flows, in a pulp and paper mill, at a temperature between 500°-525° F. (approximately 260°-274° C.). Because of this relatively high temperature range, an ordinary Coriolis meter is simply not suitable for this application. Generally speaking, most ordinary Coriolis meters known in the art are capable of operating at a temperature up to 400° F. (approximately 204° C.). Operation at temperatures that extend beyond 400° F. becomes very problematical and at much higher temperatures, such as up to 800° F. (approximately 427° C.), essentially impossible for an ordinary Coriolis meter known in the art. This limitation arises for several reasons all due to the components used in such a meter.

In particular, while suitable alloys exist from which flow conduits can be fabricated for high temperature use, such as up to 800° F., the same is generally not true for wiring and coils and associated components used in the meter.

First, wiring has insulation which carries certain temperature limits. Generally, the insulation that is used in ordinary light gauge coil wire and/or signal wiring can not withstand temperatures as high as approximately 430° F. (approximately 220° C.) before the insulation becomes plastic and melts. Clearly, if the wire used to make sensing and drive coils for use within a Coriolis meter were manufactured using such insulation, as is commonly done, then once the temperature of these coils exceeded approximately 430° F., individual turns on the coil would likely short thereby, at the very least, injecting error into the performance of the meter. Moreover, any internal wiring which employed this insulation and ran between these coils and a suitable connector mounted on a case of the meter would also begin to melt thereby eventually permitting one or more of these wires to themselves contact the case of the meter which is generally grounded and as a result, in turn, cause the meter to malfunction.

Second, even assuming that a wiring insulation could be found that would withstand a high temperature in excess of 400° F., the wiring that runs from the sensing and drive coils is often affixed to the flow conduits by a suitable tape, varnish or adhesive. These three materials often carry a temperature rating of up to approximately 430° F. (approximately 220° C.). As such, the tape, varnish and/or adhesive would melt as the temperature of the meter exceeded 430° F. thereby causing the wiring to separate from the conduits and, in turn, inject error into the operation of the meter. At first blush, one would think that a wire coated with a high temperature ceramic insulation would be satisfactory. It may not be. Unfortunately, high temperature ceramic insulation tends to be brittle. As such, ceramic insulated wire could not be affixed to an oscillating flow conduit for any appreciable amount of time without the ceramic insulation eventually fatiguing and cracking which, in turn, would cause the wire itself to disadvantageously short against a grounded flow conduit thereby injecting error into the performance of the meter. Moreover, due to the brittle nature of ceramic insulation, ceramic coated wire can not be readily wound into a small diameter coil without the insulation breaking and possibly causing shorted turns.

Third, the bobbins on which the sensing and drive coils are wound are frequently plastic which itself has a rather low melting point. Thus, whenever the meter is heated, the coil bobbins would increasingly deform which would, in turn, inject error into meter performance.

Fourth, although various conductive materials exist that can be used for high temperature wire, most of these materials exhibit various drawbacks that render these materials unsuitable for use in a high temperature Coriolis meter. In particular, these materials include various nickel based alloys which tend to be magnetic. Unfortunately, if a sensing coil were to be wound with magnetic wire, the magnetic properties of the wire would interfere with the constant magnetic field generated within the velocity sensor and consequently inject measurement errors, particularly zero flow offset values, into the performance of the meter. Copper wire could not be used inasmuch as it exhibits grain growth at temperatures above 400° F. which would cause creepage and eventual fatigue. Moreover, the resistance of most conductors increases with temperature. If wire manufactured from such a conductor were to be used in the drive coil, then as the temperature of the meter increases, additional power would disadvantageously need to be supplied to the drive coil in order to overcome the additional resistance of the drive coil.

For these reasons, the art turned to a solution exemplified by the teachings of U.S. Pat. No. 4,738,143 (issued to D. Cage et al on Apr. 19, 1988 and henceforth referred to as the '143 patent). This solution is aimed at providing a high temperature Coriolis mass flow rate meter in which the flow conduits themselves are thermally isolated from the wiring and coils. Specifically, this meter incorporates a thermally insulated partition in which the flow conduits are situated. Appropriate cutouts exist in the partition in order to permit the velocity sensors and drive coils to be mounted outside of the partition and on standoffs that emanate from the flow conduits. An active gas cooling purge line, typically using nitrogen gas flowing at a sufficient flow rate, is incorporated into the meter in order to maintain the velocity sensors and drive assembly at a relatively low temperature. An outer case surrounds the thermally insulated partition. Internal meter wiring is run in the space between the outer case and the thermal partition and is frequently wrapped around an internal purge tube.

While the meter disclosed in the '143 patent provides satisfactory operation at relatively high temperatures, it quickly became apparent that this meter also suffers various drawbacks that tend to limit its utility. First, owing to the incorporation of an internal thermal partition, the meter is complex, relatively expensive and difficult to build. Second, the meter requires that an active source of gas be connected to the purge line of the meter. The attendant increase in process plumbing necessitated by the purge line increases the complexity and cost of the installation of the meter, while the continual use of purge gas increases the cost associated with operating the meter. Third, proper operation of the meter necessitated that the cooling purge continually operate whenever the meter is at an elevated temperature. If the cooling purge fails for any reason while the meter remains at this temperature, then the coils and/or wiring would quickly fail. As such, a customer needs to exercise extreme vigilance over the status of the cooling purge if only to prevent the meter from becoming inadvertently destroyed. Unfortunately, routine monitoring of the cooling purge imposes an added maintenance burden on personnel at a customer location. In fact, the press of other more urgent matters might cause these personnel to not be sufficiently attentive and responsive to a failure in the cooling purge thereby inadvertently allowing the meter to overheat and be destroyed. Fourth, the purge line, particularly if the purge gas is set at an excessive flow rate, may cool the flow conduits within the meter to the point at which the high temperature process fluid flowing therethrough may disadvantageously freeze within either or both of the flow conduits. Fifth, heating blankets, when used, may also cause the meter to fail. Specifically, to prevent a high temperature process fluid from freezing, the lines, including any in-line ancillary metering equipment connected thereto through which that fluid will flow, would typically be wrapped in heating blankets which, in turn, would pump an adequate amount of heat into both the wrapped lines and in-line equipment. If such a blanket is wrapped around a Coriolis mass flow rate meter that has a purge line, then the additional heat generated thereby may overcome the cooling effect of the purge and disadvantageously cause the meter to heat to an excessively high temperature. As such, this additional heat may well cause an electrical component, such as a coil, situated within the meter to fail.

Therefore, a need exists in the art for a Coriolis mass flow rate meter that can reliably operate at temperatures in excess of 500° F. and preferably as high as 800° F. without the necessity of using a cooling purge. Such a meter should also be relatively simple, inexpensive and easy to build.

SUMMARY OF THE INVENTION

Accordingly, an object of the present invention is to provide apparatus for a Coriolis mass flow rate meter that is capable of reliably operating at relatively high temperatures, such as in excess of 500° F. (approximately 260° C.) and preferably as high as 800° F. (approximately 427° C.).

Another object is to provide such a meter that does not utilize a cooling purge.

An additional object is to provide such a meter that is relatively simple, inexpensive and easy to construct.

These and other objects are accomplished in accordance with the teachings of the present invention by a high temperature Coriolis mass flow meter having: an hermetically sealed housing for flow meter; an inert gas located within the housing; a flow conduit, which is substantially insusceptible to carbide precipitation occurring in temperature range of 500° to approximately 800° F. (approximately 260° to 427° C.), for receiving fluid therethrough whose mass flow rate is to be measured; a mount for the flow conduit; a high temperature driver, responsive to a driver signal, for vibrating the flow conduit with respect to its mount; a high temperature sensor for sensing the deflection of the flow conduit caused by fluid flow through the conduit and for producing a deflection signal representative of the deflection, wherein the driver and the sensor each have: a high temperature magnet, a high temperature coil, multiple internal insulated wiring leads, a terminal block having multiple conductors mounted adjacent to the high temperature coil and in a stationary relationship with respect to the housing, and a high temperature U-shaped flexure which itself contains one or more uninsulated electrical conductors for electrically interconnecting the high temperature coil with the adjacent terminal block; a feed-through having multiple conductors therethrough for providing an hermetically sealed passage for routing signals through the housing, the signals including both the driver signals and the deflection signals from the driver and the sensor; multiple internal insulated wiring leads for electrically interconnecting individual ones of the conductors of the terminal block with corresponding internal ends of the individual conductors of the feed-through; and multiple external insulated wiring leads for providing at least a portion of the electrical interconnection between individual external conductors of the feed-through and an external electronic processing circuit.

In accordance with a feature of the invention, the housing of the inventive meter can be pressurized at room temperature to a negative pressure with respect to atmospheric pressure, i.e. such as 5 psi (approximately 0.245 kilograms/square centimeter), in order to allow a relatively thin walled and inexpensive housing to be used in lieu of a domed welded structure. When a meter employing such a thin walled housing is subjected to approximately 800° F. (approximately 427° C.), the internal pressure existing within the housing essentially reaches atmospheric pressure which, in turn, minimizes any differential pressure that would otherwise appear across the internal and external walls of the housing. By doing so, the need for a thick walled structure and its attendant cost is advantageously eliminated.

BRIEF DESCRIPTION OF THE DRAWINGS

The teachings of the present invention may be readily understood by considering the following detailed description in conjunction with the accompanying drawings, in which.

To facilitate understanding, identical reference numerals have been used, where possible, to denote identical elements that are common to the figures.

DETAILED DESCRIPTION

After reading the following discussion, those skilled in the art will realize that although the inventive meter is specifically applicable to use in relatively high temperature environments, i.e. in excess of 500° F. (approximately 260° C.), the meter by virtue of its hermetic seal and inert internal atmosphere can be used in substantially any application, where for safety or other purposes, the measuring elements, i.e. the flow conduits, must be isolated from the environment, such as for use with highly toxic or reactive substances.

Figure 1:
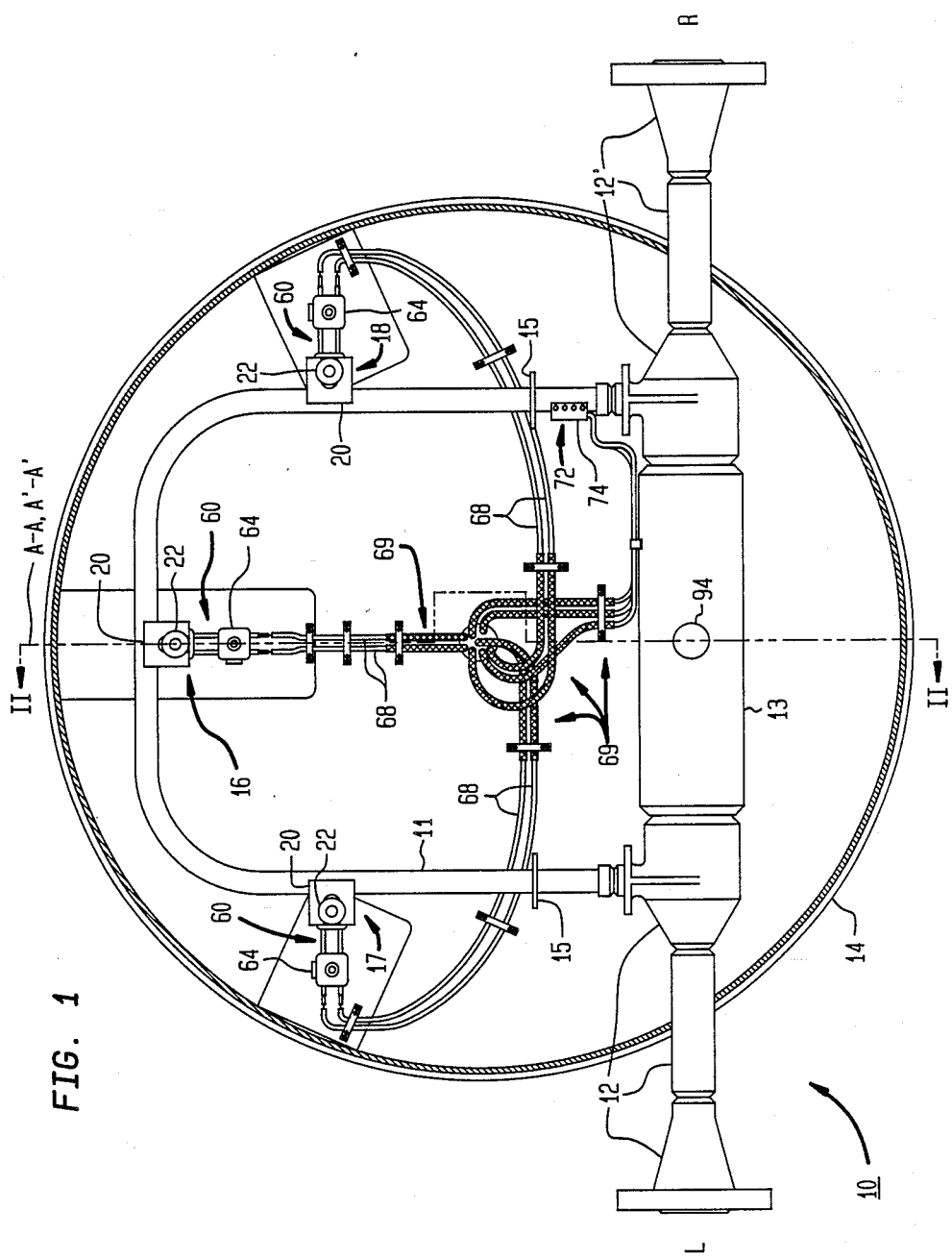
FIG. 1 is a front sectional elevation of high temperature Coriolis mass flow rate meter 10 that embodies the teachings of the present invention and illustratively taken through lines I—I shown in FIG. 5.
Figure 2:
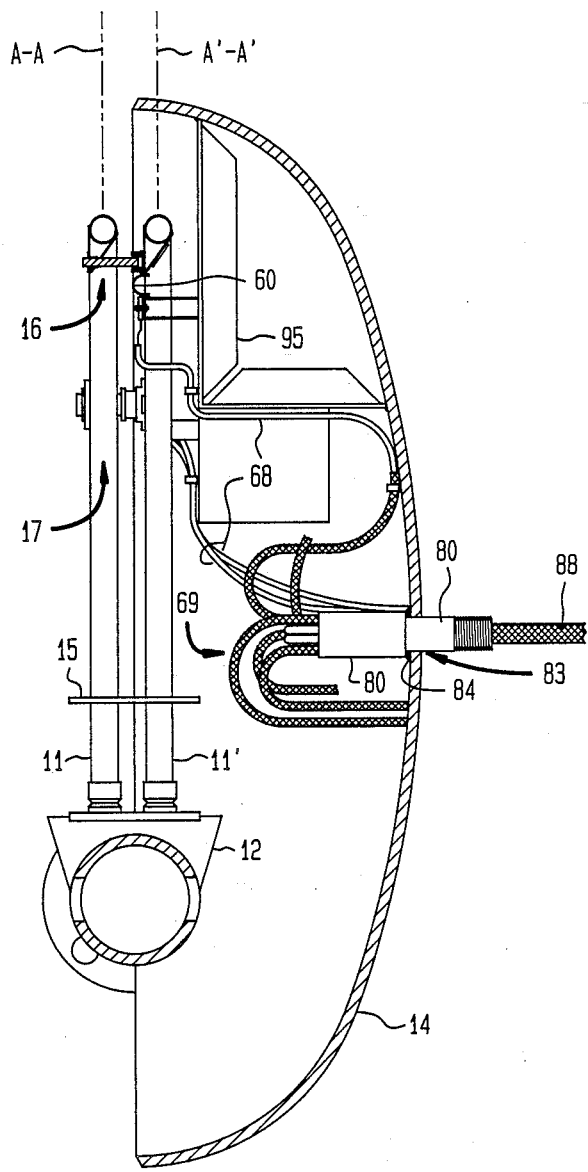
FIG. 2 is a sectional elevation of inventive meter 10 shown in FIG. 1 and taken along lines II—II shown therein.

FIGS. 1 and 2 show a preferred embodiment of a high temperature Coriolis mass flow meter 10 that incorporates the teachings of the present invention.

Specifically, as shown, flow meter 10 incorporates dual flow conduits 11 and 11' which are affixed to corresponding manifolds 12 and 12'. Manifolds 12 and 12' are held in alignment by spacer 13 which is a hollow cylinder. Manifolds 12 and 12' and spacer 13 are all made of 316L and 304L type stainless steel, respectively. Manifolds 12 and 12' direct flow through flow meter 10. For illustrative purposes, assuming that the left side, denoted as "L", of flow meter 10 is the inlet and the right side, denoted as "R", is the outlet of the meter, left manifold 12 divides the incoming flow into two streams and directs the resulting flow into dual flow conduits 11 and 11'. Right manifold 12' recombines the flow leaving the dual flow conduits into one stream after which it then exits the flow meter. Housing 14, which is described in detail later, fully encloses flow conduits 11 and 11'. When dual flow conduits are used, brace bars 15 are provided between the dual flow conduits. Specifically, brace bars 15 are positioned on the flow conduits adjacent to but spaced apart an equal distance from manifolds 12 and 12'. In addition to flow conduits 11 and 11', flow meter 10 also includes magnetic driver assembly 16 to resonantly vibrate flow conduits 11 and 11' in an opposing sinusoidal manner similar to that in which the prongs of a tuning fork vibrate.

Because of the desired operating temperature range for flow meter 10, flow conduits 11 and 11' are preferably made from a suitable one of the widely known nickel-chrome-molybdenum HASTELLOY alloys manufactured by Cabot Corporation of Kokomo, Ind. (which owns the trademark HASTELLOY), such as HASTELLOY alloys C22 or C276 or their equivalents for use in a temperature range of between 500° to 800° F. (approximately 260° to 427° C.). These alloys are preferred because they do not undergo carbide precipitation at the desired operating temperature range for the meter. Consequently, with this in mind, the term "flow conduit" as used hereinafter specifically means a flow conduit made of an alloy(s) that does not undergo carbide precipitation at the desired operating temperature range of the flow meter and includes conduits made of HASTELLOY alloys C22 and/or C276 or their equivalents. Also the term "high temperature" means an operating range for the flow meter from about 500° to about 800° F. (approximately 260° to 427° C.). Of course, the high temperature meter disclosed herein can fully and satisfactorily operate at normal ambient room temperatures; however, it is more suitable for use in high temperature applications.

The design of flow conduits 12 and 12' is dictated by the teachings set forth in U.S. patent application Ser. No. 06/914,932 entitled "Density Coriolis Insensitive Mass Flow Rate Meter," filed Oct. 3, 1986, which now has evolved into U.S. Pat. No. 4,823,613. Specifically, as set forth therein, the flow conduits are formed from conduits of homogeneous material that have essentially uniform wall thickness. These conduits are mounted so they can be oscillated and inherently have resonance frequencies for all modes of oscillation in which the ratio of any two resonant frequencies remains constant irrespective of any changes in the density of fluids passing through the conduits. If weights (or other structures) which do not have their masses altered by changes in fluid density, such as e.g. magnetic drive assembly 16 and velocity sensors 17 and 18, are attached to the flow conduits, then the ratio of any two such resonant frequencies will change as fluid density changes unless the positions at which these weights are attached to the flow conduit are uniquely selected. As taught in the above-noted 06/914,932 application, improved density insensitivity can be achieved if the ratio of modal mass to modal inertia for a flow conduit equals the ratio of the mass of all attachments to the flow conduit divided by the inertia of the attachments to the flow conduit. One result of applying this teaching is the use of flow conduits that each has a more equal height to width ratio using two separate 90 degree radius bends with a straight conduit section situated therebetween, as specifically shown in FIG. 1, than that occurring with a full radius 180 degree bend as is commonly used in the art.

Flow meter 10 includes velocity sensors. These sensors are analog velocity sensors which provide analog signals linearly representative of actual differential movement of flow conduits 11 and 11' over their entire path of motion. When flow conduits 11 and 11' are vibrating and fluid is flowing therethrough, these flow conduits are deflected about their respective axes A—A and A'—A' (see specifically FIG. 2) by Coriolis forces resulting from the moving fluid. The effects of these deflections are monitored by velocity sensors 17 and 18. A detailed description of the mechanical operation of flow meter 10, particularly with respect to the generation of Coriolis forces and measurement of mass flow rate resulting therefrom, is set forth in U. S. Pat. Nos. 4,491,025 (issued to J. E. Smith et al on Jan. 1, 1985) and 4,422,338 (issued to J. E. Smith on Dec. 27, 1983). The additional requirements for constructing velocity sensors 17 and 18 and magnetic drive assembly 16 such that they are capable of operating at an elevated temperature are discussed hereinbelow.

Figure 3A:
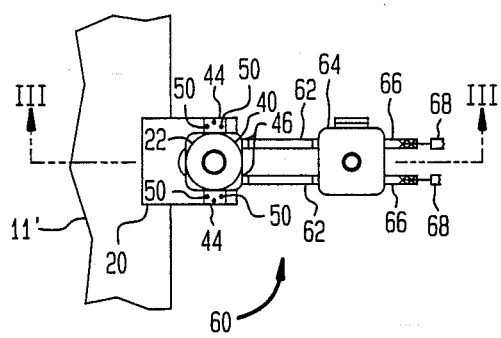
FIG. 3A is a top elevational view of sensing coil 22, as mounted to one flow conduit of inventive meter 10 and specifically as part of velocity sensor 18, and associated flexure assembly 60.
Figure 3B:
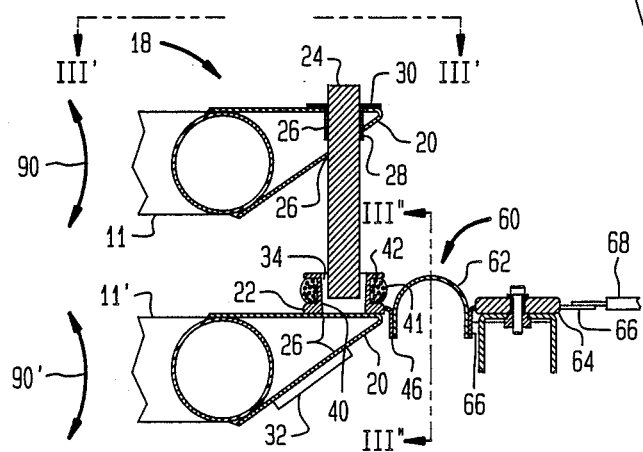
FIG. 3B is a cross-sectional view of velocity sensor 18 depicted in FIG. 3A and taken along lines III—III and specifically shown mounted to two flow conduits.
Figure 3C:
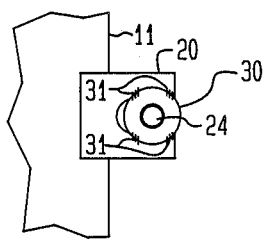
FIG. 3C is a top sectional view of velocity sensor 18 showing the mounting of magnet 24 depicted in FIG. 3B and taken along lines III'—III' shown therein.

As shown in FIGS. 3A-3C, velocity sensors 17 and 18 and magnetic drive assembly 16 are mounted to flow conduits 11 and 11' via V-shaped, two-legged, metallic support clips 20. These clips are vacuum brazed onto flow conduits 11 and 11'. A separate support clip is provided for each coil 22 and each magnet 24 comprising velocity sensors 17 and 18 and magnetic drive assembly 16. To simplify their construction and installation, all support clips 20 are identical, have vertically aligned openings 26 through both legs thereof and are made of 316L or 304L type stainless steel. Support clips are identically positioned on each of the two flow conduits. Since both velocity sensors 17 and 18 are identical, for purposes of brevity, the following discussion will specifically address velocity sensor 18. In particular with respect to velocity sensor 18, support clips 20 are aligned as adjacent pairs between flow conduits 11 and 11': one support clip for the magnet, the other for the corresponding coil. Preferably, for ease of wiring, magnet 24 is mounted on one of the flow conduits, here illustratively flow conduit 11, while the associated coil is mounted on the other flow conduit, here illustratively flow conduit 11'. Typically, each magnet 24, which is a solid cylinder, is press-fitted into a cylindrical 316L type stainless steel sleeve 28 having flange 30 located at one end thereof. The magnet and sleeve assembly is then inserted through central openings 26 in one support clip so as to be in coaxial alignment with coil 22. Flange 30 is fastened by welds 31 (here indicated by "X" marks) to the outer surface of one leg of a support clip (see FIG. 3C). Normally, magnet 24 has a greater mass than that of its corresponding coil 22. Counterweight 32, such as a suitable flat washer, is tack welded onto the support clip for each coil 22 so that the two flow conduits are balanced. As shown in FIG. 3B, the spacing between flow conduits 11 and 11' is such that the end of the magnet 24 will remain within annular opening 34 of coil 22. Magnet 24 is dimensioned such that it is closely received into annular opening 34 when both are positioned on the flow conduits. This arrangement and structure also applies to magnetic drive assembly 16.

Flow meter 10 is designed so that coil 22 is always moved within the essentially uniform magnetic field of magnet 24. A description of the operation of velocity sensors 17 and 18 for use in single and dual conduit Coriolis mass flow rate meters is set forth in abovementioned U.S. Pat. Nos. 4,422,338 and 4,491,025. Though both velocity sensors 17 and 18 generate corresponding output signals, which are generally sinusoidal in nature, one sensor signal leads the other in time. The time difference between the two signals results from the fact that flow conduits 11 and 11' are deflected by Coriolis forces. The amount of the time difference between the two signals is related to the mass flow rate passing through flow meter 10.

In order for magnetic drive assembly 16 and velocity sensors 17 and 18 to operate reliably between 500° to 800° F., their materials from which they are constructed must be carefully selected. After experimenting with various magnetic alloys, we have found that magnets fabricated from ALNICO alloys 8 or 9 retain sufficient magnetic strength to operate properly in combination with the coil. However, we have found that magnets constructed of ALNICO alloy 2 will lose an excessive amount of their magnetic properties at these elevated temperatures. Thus, the term high temperature magnet as used herein means a magnet capable of retaining its magnetic properties between 500° to 800° F. and includes magnets made from either ALNICO 8 or ALNICO 9 alloys or their equivalents.

Figure 3D:
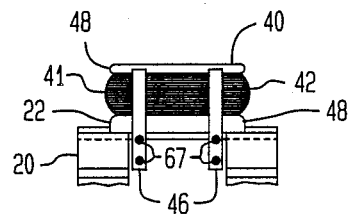
FIG. 3D is a sectional view showing a connection between flexure 60 and coil 22 and taken along lines III"—III" shown FIG. 3B.

Coils 22, as shown in FIGS. 3A, 3B and 3D, each consists of an assembly comprised of cylindrical ceramic bobbin 40, having opening 34 coaxially extending therethrough along a longitudinal axis of the bobbin. The bobbin for each velocity sensor needs to be made from a suitable material; while the bobbin for the magnetic drive assembly can be made from a suitable metallic substance such as a stainless steel alloy, if desired. Coil matrix 41 is formed on the exterior of bobbin 40 and positioned intermediate the ends of bobbin 40. The coil matrix is a coil of fine silver wire 42 whose turns are separated from one another by a hardened ceramic slurry (see FIG. 3B). Gold or platinum wire can be used in lieu of silver, although silver is far less expensive than either of the two alternate materials. Preferably, bobbin 40 is made from an injection molded ceramic and includes metal inserts, i.e. mounting inserts 44, and flat metal wire termination posts 46, both preferably made of stainless steel. Use of an injection molded ceramic simplifies manufacture of the bobbins for two reasons. First, it is much easier to precisely mount metal inserts within an injection mold for inclusion within a item that is to be injection molded than to precisely locate a comparable insert into a fired (commonly referred to as a "technical") ceramic. Second, an injection molded ceramic piece has much less dimensional variation than similar pieces made with a technical ceramic. Silver wire 42, having a diameter of about 5 mils is wound between two spaced apart flanges 48 located on the exterior of bobbin 40. As the wire is wound around the bobbin, the wire is coated with a sodium silicate ceramic slurry. The bobbin is then allowed to dry either in air or in an oven. Once the slurry has dried, the slurry and wire collectively form a solid matrix. Although this slurry increases the effective diameter of the wire hence limiting the number of turns that can be wound on the bobbin, the use of the slurry firmly positions the wire turns within the ceramic matrix thereby ensuring that the coil turns will not electrically short out to one another during subsequent high temperature meter operation. Preferably, the wire is wound onto the bobbin so that the cross-section of the coil is as uniform as possible. Each end of the coil wire is wrapped around a termination post 46 a sufficient number of times in order to provide an appropriate strain relief as is commonly known in the art. The wrapped wire is then brazed to the post using a standard silver alloy braze. Posts 46 serve as a junction/transition point between the coil wire and a flexure ribbon wire described below. Coils 22 are secured to flow conduits 11 and 11' by spot welding mounting inserts 44 to support clips 20 as indicated by welds 50 (see FIG. 3A).

Furthermore, we have discovered that the materials needed for the bobbin and ceramic slurry should preferably contain no metal oxides at high temperatures. Specifically, at 800° F., a severe reducing atmosphere is present which causes most metal oxides to be reduced into their constituents which includes free oxygen. As such, the metal in the oxide in the bobbin precipitates out onto the coil thereby rendering the entire coil conductive which, in turn, gives rise to spurious signals and, at the least, erroneous meter performance. Alternatively, if metal oxides must be present in the bobbins at room temperature, then these oxides must be chemically bound so that they will not be reduced at high temperatures. As can be appreciated the term "coil" herein means an assembly comprising a noble metal wire wound on a ceramic bobbin with the wire being insulated by a ceramic slurry with the bobbin and slurry containing no reducible metal oxides in the desired operating temperature range. Similarly, the terms "drive assembly" and "velocity sensor" both mean an assembly that comprises a high temperature magnet and coil.

Electrical signals have to be provided to magnetic drive assembly 16 and must also be routed from velocity sensors 17 and 18. It was known that wires could be wrapped about flow conduits 11 and 11' and be routed to drive assembly 16 and velocity sensors 17 and 18. However, routing wires in this fashion invariably causes damping forces to be transmitted to vibrating flow conduits 11 and 11'. These damping forces, which for example can be caused by friction between the wires and the flow conduits, will change the amount of deflection of these flow conduits about their respective axes A—A and A'—A'. Changes in the amount of deflection caused by these damping forces inject measurement errors into the performance of the meter and for that reason have to be substantially minimized or eliminated. A structure (hereinafter referred to as a "flexure") for use in a Coriolis meter which is capable of substantially reducing or even eliminating these damping forces is described in the abovementioned U.S. Pat. No. 4,738,143 (issued to D. Cage et al on Apr. 19, 1988) and in United States patent application Ser. No. 06/865,715 entitled "Apparatus for Electrically Interconnecting Vibrating Structures" filed May 22, 1986.

The flexure as used in the present invention, generally indicated by numeral 60 and shown in FIGS. 2 and 3A and 3B, is comprised of at least two flat, uninsulated, spaced apart stainless steel ribbon shaped conductors 62. These conductors have a cross-section of typically 0.002" thick by 0.050" wide (approximately 0.00508 by 0.127 centimeters). An identical flexure is provided for each velocity sensor and the magnetic drive assembly. For each flexure 60, conductors 62 that form the flexure are inserted between wire posts 46 of coils 22 and stationary terminal blocks 64 that are mounted on the housing, specifically through stationary angle brackets 95 that are located adjacent to each coil but spaced apart therefrom. Terminal blocks 64 provide an insulating housing for flat ribbon conductors 66 which extend out beyond the terminal block housing and on opposite sides therefrom. One flat end of each of conductors 66 and a corresponding post 46 are aligned along their widths and lengths in a parallel spaced apart fashion. The flat surfaces of U-shaped conductors 62 are aligned with the corresponding surfaces of post 46 and conductors 66. When connected, flexure 60, specifically conductors 66, substantially forms a U-shape with its centerline oriented in an essentially parallel fashion to the direction of oscillation of flow conduits 11 and 11' (see FIG. 3B), this direction being indicated by arrows 90 and 90' for flow conduits 11 and 11', respectively. This shape and orientation allows for a rolling or wave-like motion of flexure 60 as flow conduits 11 and 11' oscillate with respect to the stationary terminal blocks 64. The alignment of the flat surfaces of post 46 and conductors 62 and between conductors 66 and conductors 62 advantageously permits these components to be assembled using spot welds 67 (see FIG. 3D), provides a large surface area for attachment and provides strain relief for these connections. As shown in FIG. 3B, the opposite ends of conductors 66 are attached by spot welds to solid, round nickel wire leads 68. Leads 68 are insulated along a portion of their length near feed-through 70 (see FIG. 2), preferably with an annealed fiberglass sheath 69 and are routed about the inside surface of housing 14 to nine wire feed-through 70. In particular, prior annealing of the fiberglass sheath is used to help prevent fraying of the insulation that can occur at these high operating temperatures. Moreover, nickel clad copper is conventionally recommended for use at high temperatures. Surprising, we have found that nickel wire is a superior conductor to nickel clad copper at these temperatures. However, we have found nickel wire difficult to weld and easy to break due to embrittlement.

Figure 4:
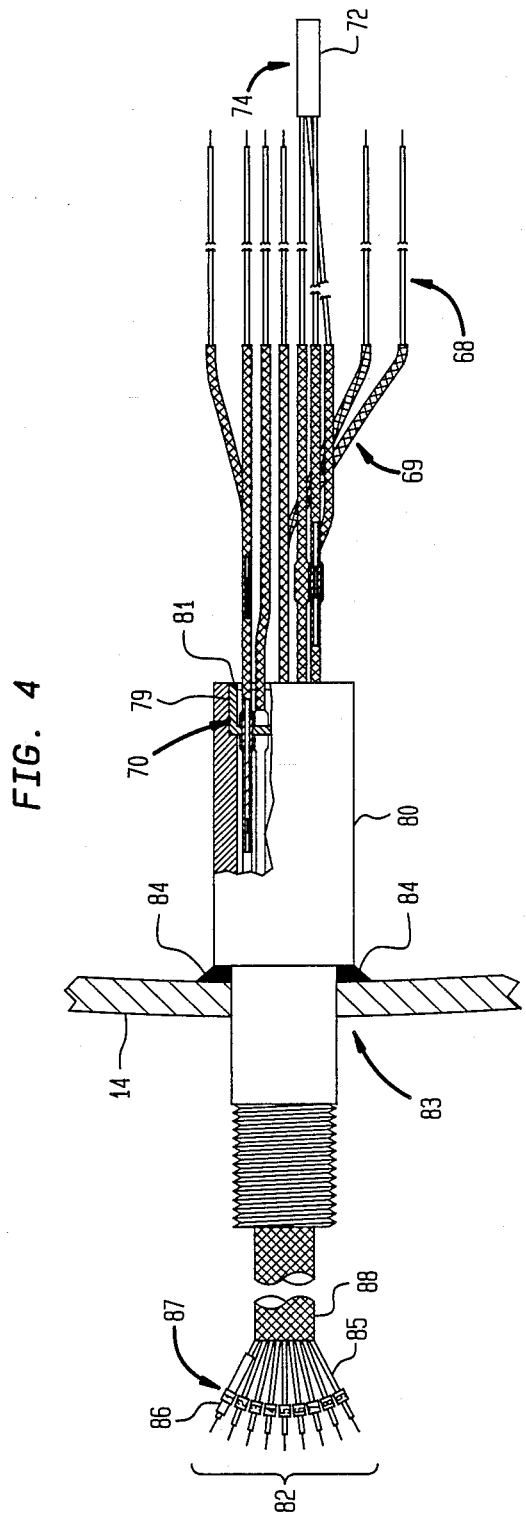
FIG. 4 is a detailed view of nine wire high temperature feed-through 70 shown in FIG. 2.

As shown in FIGS. 1 and 4, internal wire leads 68 are connected to external wire leads via conventional nine pin brazed ceramic feed-through 70, as is commonly known in the art. Six of these nine wires are from coils of magnetic assembly 16 and velocity sensors 17 and 18. The remaining three wires are from temperature sensor assembly 72 (see FIG. 1), which illustratively includes a platinum resistance temperature device (RTD), that is used to measure the temperature of the flow conduit. Where a platinum RTD is used, internal wire leads would be spliced onto the leads of the RTD to provide sufficient length to reach feed-through 70. As is known in the art, temperature sensing is used to provide compensation for changes in a spring constant of each flow conduit caused by a change in its temperature from ambient conditions. As can be seen in FIG. 1, RTD assembly 72 is affixed to flow conduit 11 via metal sleeve 74 that is welded to the surface of one of the flow conduit. A three wire RTD element is inserted into sleeve 74 through one end thereof. Both ends are then crimped to prevent the RTD element from sliding out. Tape is normally used to fasten the RTD to the surface of a flow conduit in a Coriolis flow meter that is designed to operate at relatively low temperatures. However, when used in a meter operating at high temperatures, the tape would eventually burn off and, as such, welding is used instead.

As shown in FIGS. 1, 2 and 4, feed-through 70 is provided with metal lip 79. Through use of this lip, the feed-through is secured into hollow cylindrical standoff 80 provided on the interior side of housing 14 by weld 81. The use of the feed-through is required by the need to hermetically seal the meter. External leads 82 pass through opening 83 provided in housing 14. An additional weld 84 located between the exterior of standoff 80 and interior surface of housing 14 seals opening 83 once the standoff is installed. Round, stranded, nickel wire leads 82 are connected to an external side of wire feed-through 70. External leads 82, typically four feet (approximately 1.22 meters) in length, are preferably connected by brazing to the external ends of corresponding pins of feed-through 70. Each of the nine wires utilize an identical structure within feed-through 70. Hence, to simplify FIG. 4, the structure of the feed-through that is used for only one of these wires is specifically shown therein. We have found this method of connection provides a strong joint. In addition, external leads 82 are triple insulated. Specifically, first, external leads 82 are each individually wrapped with mica tape 85, then covered by a polytetrafluoroethylene (PTFE) impregnated, woven fiberglass sheath 86. For illustrative purposes, only one external lead 82 is shown having a sheath 86. Prior to installing sheath 86 on each one of leads 82, the first 6 to 10 inches (approximately 15 to 25 cm) of these sheaths are baked (annealed) in air at an about 800° F. (approximately 427° C.). The PTFE acts as a binder to prevent fraying prior to annealing. The PTFE binder could be eliminated if a suitable heat-treated sheath could be found. At this temperature, carbon in the PTFE and/or any oxides in the insulation are both driven off. We have discovered that this baking is necessary in order to avoid carbon buildup on ferrules and feed-through pins that are located on the external side of feed-through 70 during meter operation at a high temperature. In particular, when the flow meter is heated to a temperature of 800° F. (approximately 427° C.), carbon is driven off the insulation but insufficient oxygen is present to oxidize the carbon. As such, the carbon builds up on the ferrules and feed-through pins situated on the external side of the feed-through. Because carbon is conductive, once it accumulates on the feed-through pins, it electrically shorts the pins together. Baking of sheaths 86 prior to their installation over leads 82 eliminates the carbon build-up but unfortunately makes the baked portions of these sheaths somewhat brittle. In order to protect these baked portions, all of the external leads are bundled together and sheathed within woven fiberglass sheath 88. The external wiring is protected in this fashion because the preferred annealed fiberglass sheaths used for the internal wiring are not available in a sufficiently large diameter to sheath each one of external leads 82 or the entire bundle of external leads. Again, insulation is necessary on the external leads because these leads are exposed to a reducing atmosphere that is, in most cases, actually higher in temperature than the actual process fluid because the flow meter is usually wrapped in a heating blanket in order to maintain its temperature at or near the temperature of the process fluid. Also, the inert atmosphere, as discussed below, that exists within the housing does not extend from the housing to these external leads. The external leads provide at least an initial portion of an electrical connection between flow meter 10 and its remotely located and well known signal processing and drive electronics (not shown). For purposes of easy identification, each of leads 82 carries a corresponding identification tag 87 (here illustratively carrying the numbers one through nine) that specifically identifies that lead for subsequent proper connection to the electronics.

Figure 5:
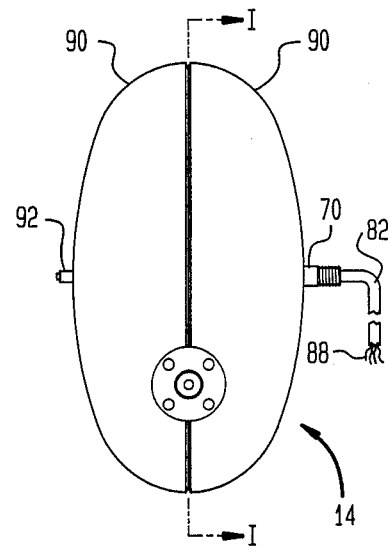
FIG. 5 is a side elevation of inventive flow meter 10 shown in FIG. 1 and as mounted within housing 14.

Housing 14 is not simply a cover for the flow conduits and other internal components. This housing, when installed, maintains an hermetically sealed, inert gas environment for all the internal components of the flow meter. As shown in FIG. 5, housing 14 is fabricated from two standard tank domes (tank heads) 90 formed of plate steel, each having elliptical cross-sections with an illustrative ratio of 2:1 between its major and minor axes. Hence, domes 90, when assembled together, give the flow meter the appearance of an oyster shell. Domes 90 completely enclose flow meter 10. Openings are provided for feed-through 70, purge fitting 92 and inlet and outlet manifolds 12 of flow meter 10. All openings through the housing are welded so that a hermetic seal is achieved. After the housing is welded shut, a vacuum is drawn on the case via purge fitting 92 to withdraw any air that may be present. Hole 94 (see FIG. 1) is provided in spacer 13 to ensure that air residing within the interior of the spacer can subsequently be vented after the spacer is welded between manifolds 12. An inert gas, such as helium or preferably argon, is then injected into housing 14 via purge fitting 92. Purge fitting 92 is then sealed either by a plug or by welding. The inert gas is necessary in order to displace anyoxygen that may be inside the housing. At the desired operating temperatures, any air creates an aggressive reducing atmosphere which will corrode the wires and coils. The use of an inert gas prevents this from occurring as well as eliminating the need for a cooling purge.

Inert gas is injected either at atmospheric pressure or at a reduced pressure. If inert gas at atmospheric pressure is used, then, when the flow meter is heated to 800° F. (approximately 427° C.), the internal pressure within the housing will increase to approximately 35 pounds per square inch (psi) (approximately 2.45 kilograms/square centimeter). Accordingly, housing 14 must be able to contain this pressurized atmosphere at these operating temperatures. Alternatively, if the inert gas is injected at a reduced pressure, such as 5 psi (approximately 0.245 kilograms/square centimeter), then the internal pressure at operating temperature will only be about 12 psi (approximately 0.84 kilograms/square centimeter) or normal ambient pressure. If this latter approach is used, then the housing can be fabricated from sheet steel instead of the tank domes; thus reducing the overall weight and cost of the flow meter.

Type 316L stainless steel is typically used to fabricate all metallic elements for which a specific alloy or material has not been specified herein.

Although the inventive meter is described in the context of use for measuring mass flow rate, since electrical connections to either flow conduit sensor, the drive coil and the RTD temperature sensor are provided through the meter case to the external environment, the inventive meter can also be used as the measuring element in a Coriolis based densitometer in lieu of just as a Coriolis mass flow rate meter. Furthermore, with suitable electronics, the inventive meter can also be used as the measuring element to simultaneously provide both density and mass flow rate measurements for use in those applications that require both measurements of a moving fluid, such as in a net oil computer that provides both volumetric and mass based flow rate and totalized flow measurements of individual oil and water components that constitute an oil-water emulsion.

In addition, those skilled in the art readily appreciate that, although the disclosed embodiment of the inventive Coriolis meter utilizes U-shaped flow conduits, flow conduits (tubes) of almost any size and shape may be used as long as the conduits can be resonantly oscillated (vibrated) about an axis to establish a non-inertial frame of reference for fluid passing therethrough. For example, these conduits may include but are not limited to straight tubes, S-shaped tubes or looped tubes. In addition, although fluid has been shown as entering the manifolds in a direction substantially perpendicular to the flow conduits, each manifold can be adapted to receive and discharge fluid in a direction substantially parallel to or at any angle to the ends of the flow conduits. Lastly, although the meter has been shown as containing only two parallel flow conduits, embodiments having a single flow conduit or more than two parallel flow conduits—such as three, four or even more—may be used, if desired, provided suitable changes are made to the geometry of the meter in order to accommodate the desired number and orientation of the desired flow conduits.

Although one embodiment of the present invention has been shown and fully described herein, those skilled in the art clearly realize that many other varied embodiments may be easily constructed that nevertheless contain the teachings of the present invention.

We claim:

1. A Coriolis mass flow meter, electrically connectable to processing means including means for providing a driver signal to said meter and to means for processing a deflection signal produced in said meter to provide an output representative of the mass flow rate of the fluid flow, said flow meter being capable of operating in a temperature range having a lower boundary in excess of 260 degrees C., comprising:
   means for hermetically enclosing said flow meter;
   an inert gas situated within said enclosing means;
   flow conduit means, substantially insusceptible to carbide precipitation occurring in said temperature range, for receiving fluid therethrough whose mass flow rate is to be measured;
   means for mounting said flow conduit;
   high temperature driver means, responsive to said driver signal, for vibrating said flow conduit with respect to said mounting means;
   high temperature sensor means for sensing the deflection of said flow conduit means caused by fluid flow through said flow conduit means and for producing said deflection signal representative of said deflection, said driver and said sensor means comprising:
   a high temperature magnet means; and
   a high temperature coil means;
   terminal block means, having multiple conductors, mounted adjacent to said high temperature coil means and in a stationary relationship with respect to said enclosing means; and
   high temperature flexure means, having one or more uninsulated electrical conductors, for electrically interconnecting said coil means of said driver means and said sensor means with said adjacent terminal block means, said flexure means dimensioned so as to form a U-shape when electrically interconnecting said coils with said conductors of said adjacent terminal block means;
   feed-through means having multiple conductors therethrough for providing an hermetically sealed passage for routing signals through said enclosing means, said signals including said driver signals and said deflection signals from said driver means and said sensor means;
   multiple internal insulated wiring leads for electrically interconnecting individual ones of said conductors of said terminal block means with corresponding internal ends of said individual conductors of said feedthrough means; and
   multiple external insulated wiring leads for providing at least a portion of the electrical interconnection between individual ones of said conductors of said external ends of said individual conductors of said feed-through means and said processing means.

2. The apparatus of claim 1 wherein the conductors of said flexure consist essentially of nickel.

3. The apparatus of claim 1 wherein the conductors of said terminal block means consist essentially of nickel.

4. The apparatus of claim 1 wherein the internal insulated wiring leads each comprise:
   a conductor consisting essentially of nickel; and
   an annealed fiberglass sheath surrounding said conductor.

5. The apparatus of claim 1 wherein the external insulated wiring leads comprise:
   individual conductors consisting essentially of nickel;
   a layer of mica tape wrapped about each individual lead;
   a woven fiberglass sheath for surrounding said mica tape wrapped wire having a pre-baked portion adjacent the end of said individual lead connected to said feed-through; and
   a woven fiberglass sheath surrounding all of said wrapped and sheathed individual leads.

6. The apparatus of claim 1 wherein said coils comprise:
   a hollow, cylindrical bobbin having metal wire posts and metal mounting inserts, said bobbin formed from an injection moldable ceramic material and having an annular opening therethrough along its longitudinal axis for receiving said magnet;

a coil matrix positioned about the exterior of said bobbin intermediate the ends thereof, said coil matrix comprising a multiple turn wire coil whose turns are separated from one another by a ceramic material and whose ends are electrically connected to said wire posts.

7. The apparatus of claim 6 wherein the metal wire is selected from a group consisting of gold, silver, and platinum.

8. The apparatus of claim 1 wherein the inert gas is selected from a group consisting of argon or helium.

9. The apparatus of claim 1 wherein the inert gas has a pressure that is less than atmospheric pressure.

10. The apparatus of claim 1 wherein the upper boundary of the temperature range is about 426° degrees C.

* * * * *